(12) United States Patent
Sitko (10) Patent No.: US 9,205,722 B2
(45) Date of Patent: Dec. 8, 2015

(54) VEHICLE WINDOW STRUCTURE

(71) Applicant: Nissan North America, Inc., Franklin, TN (US)

(72) Inventor: Jeffrey Sitko, Saline, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/257,259

(22) Filed: Apr. 21, 2014

(65) Prior Publication Data

US 2015/0298527 A1 Oct. 22, 2015

(51) Int. Cl.
*B60J 1/00* (2006.01)
*B60J 1/10* (2006.01)

(52) U.S. Cl.
CPC *B60J 1/004* (2013.01); *B60J 1/007* (2013.01); *B60J 1/10* (2013.01)

(58) Field of Classification Search
CPC .................. B32B 17/10018; B32B 17/10293; B60J 1/10; B60J 1/007; B60J 1/004
USPC ............................................ 296/146.15, 201
See application file for complete search history.

(56) References Cited

U.S. PATENT DOCUMENTS

| | | | |
|---|---|---|---|
| 3,025,098 A * | 3/1962 | Andrews | 296/152 |
| 5,902,198 A | 5/1999 | Martin et al. | |
| 7,641,274 B2 * | 1/2010 | Boehm et al. | 296/216.09 |
| 8,029,040 B2 | 10/2011 | Perrin et al. | |
| 8,460,780 B2 * | 6/2013 | Perrin et al. | 428/192 |
| 2010/0123335 A1* | 5/2010 | Finnes | B60J 1/007 296/200 |

FOREIGN PATENT DOCUMENTS

WO 84-04277 A1 11/1984

* cited by examiner

*Primary Examiner* — Pinel Romain
(74) *Attorney, Agent, or Firm* — Global IP Counselors, LLP (57) ABSTRACT

A vehicle window structure includes a vehicle body structure, a window glass and a flexible sheet material. The vehicle body structure defines a window opening with a window supporting portion extending around a periphery of the window opening. The window glass has an interior surface, an exterior surface and an outer peripheral edge extending around the window glass between the interior surface and the exterior surface. The window glass is non-movably fixed to the window supporting portion. The flexible sheet material has a main section and an attachment section. The main section of the flexible sheet material covers the exterior surface of the window glass. The attachment section extends over at least a portion of the outer peripheral edge of the window glass and away from the exterior surface of the window glass. The attachment section is fixedly coupled to the vehicle body structure.

14 Claims, 6 Drawing Sheets

VEHICLE WINDOW STRUCTURE

BACKGROUND

1. Field of the Invention

The present invention generally relates to a vehicle window structure. More specifically, the present invention relates to vehicle window structure that includes a layer of flexible sheet material that is fixed to a vehicle body structure of the vehicle.

2. Background Information

The Federal Motor Vehicle Safety Standards (FMVSS) are regularly revised and updated. A recent revision includes FMVSS 226 which was enacted to reduce the excursion or ejection of objects through a window opening during an impact event. FMVSS 226 is a performance standard that currently has no set countermeasure. FMVSS 226 includes performance tests in which a 40 pound impacting device is impacted at up to four points around the interior perimeter of window glass installed to a window opening.

SUMMARY

It has been discovered that in order to meet the performance standards of FMVSS 226, a flexible sheet material can be applied to an exterior surface of window glass, with the flexible sheet material also being separately fixed to or fixedly coupled to a vehicle body structure adjacent to areas surrounding the window opening.

In view of the state of the known technology, one aspect of the disclosure is a vehicle window structure that includes a vehicle body structure, a window glass and a flexible sheet material. The vehicle body structure defines a window opening with a window supporting portion extending around a periphery of the window opening. The window glass has an interior surface, an exterior surface and an outer peripheral edge extending around the window glass between the interior surface and the exterior surface, the window glass being non-movably fixed to the window supporting portion. The flexible sheet material has a main section and an attachment section. The main section of the flexible sheet material covers the exterior surface of the window glass. The attachment section extends over at least a portion of the outer peripheral edge of the window glass and away from the exterior surface of the window glass. Further, the attachment section is fixedly coupled to the vehicle body structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
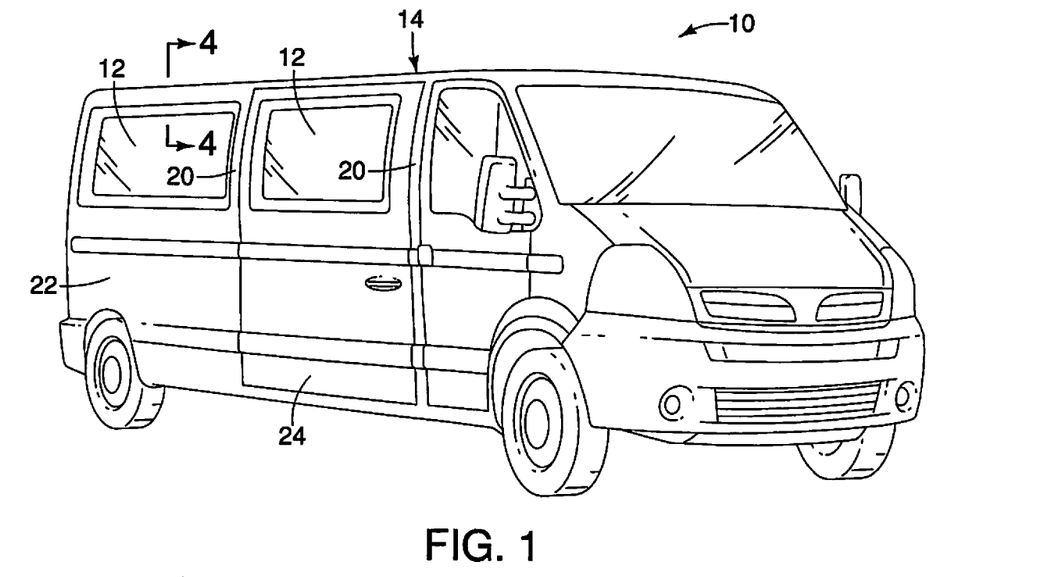
FIG. 1 is a perspective view of a vehicle that includes a vehicle body structure having a plurality of window structures with window glass that is non-movably fixed to the vehicle body structure in accordance with a first embodiment.

Referring initially to FIG. 1, a vehicle 10 having a window structure 12 is illustrated in accordance with a first embodiment. The vehicle 10 includes a plurality of window structure 12. Only one of the window structures 12 is described herein below, but applies equally to each of the plurality of window structures 12.

Figure 2:
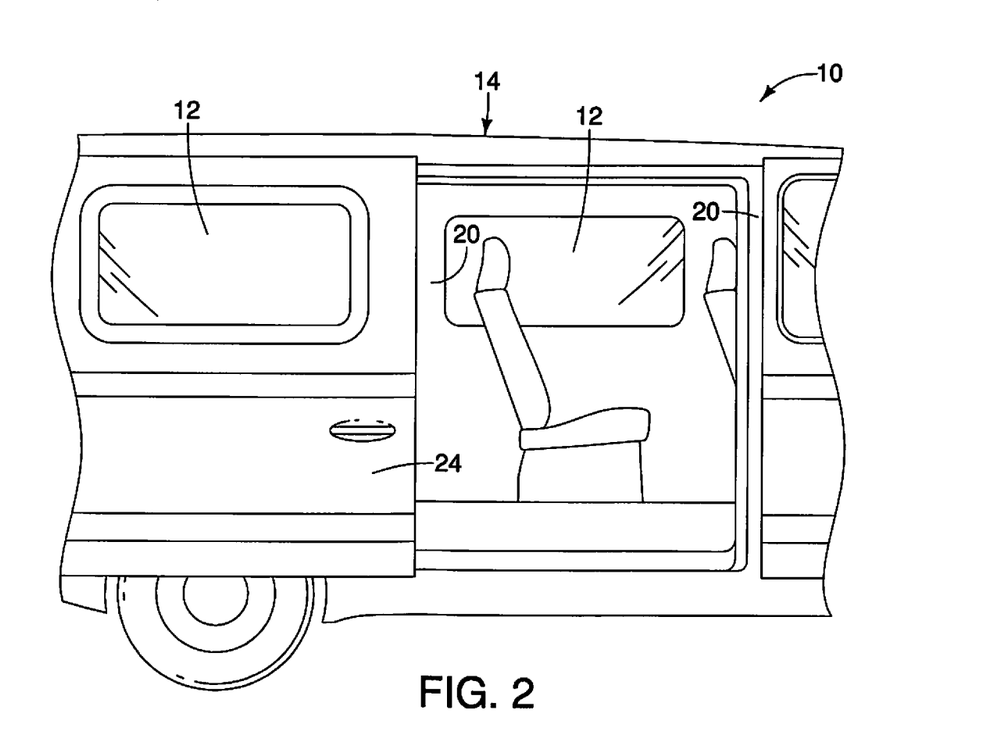
FIG. 2 is a side view of the vehicle showing a sliding door of the vehicle body structure that includes one of the window structures in accordance with the first embodiment.

The vehicle 10 has a body structure 14 that includes, among other things, pillar structures 20, body panels 22 and at least door 24. In the depicted embodiment, the door 24 is a sliding door that moved between a closed position (FIG. 1) and an open position (FIG. 2). Several of the body panels 22 and the door 24 include one or more of the window structures 12.

The window structure 12 is a fixed window that does not open, but remains closed at all times. It should be understood from the drawings and the description herein that the vehicle 10 includes windows that include mechanisms that make it possible to open and close those windows. However, as is described in greater detail below, the window structure 12 is a fixed window that is non-moveably attached to the body structure 14.

As shown in FIGS. 1 and 2, the door 24 moves between the closed position and the open position, and includes the window structure 12. The window structure 12 of the door 24 is fixed relative to the structure of the door 24 and cannot be opened relative to the structure of the door 24.

Figure 3:
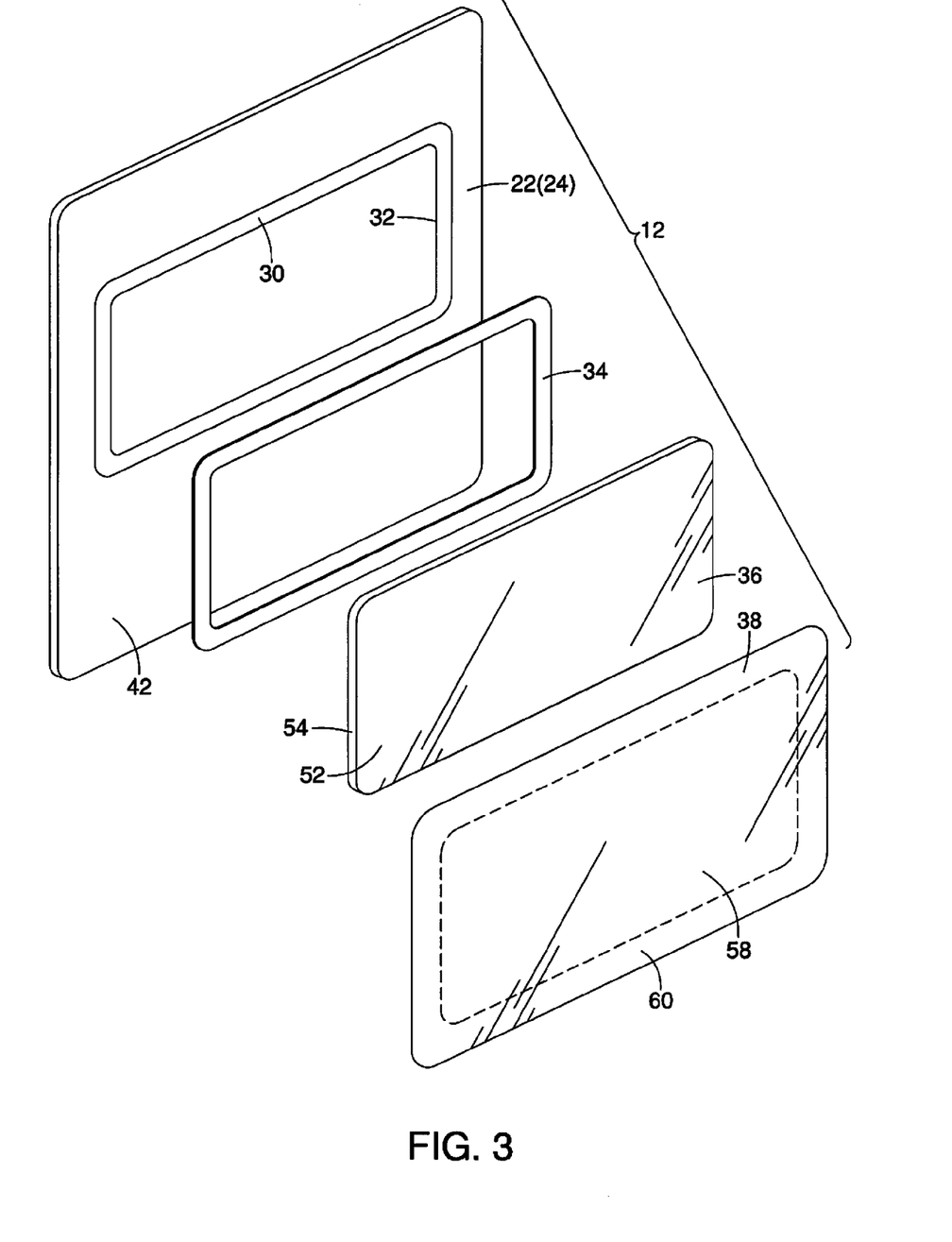
FIG. 3 is an exploded view of one of the window structures showing a window opening defined by the vehicle body structure, a sealant/adhesive material, the window glass and a layer of flexible sheet material in accordance with the first embodiment.
Figure 4:
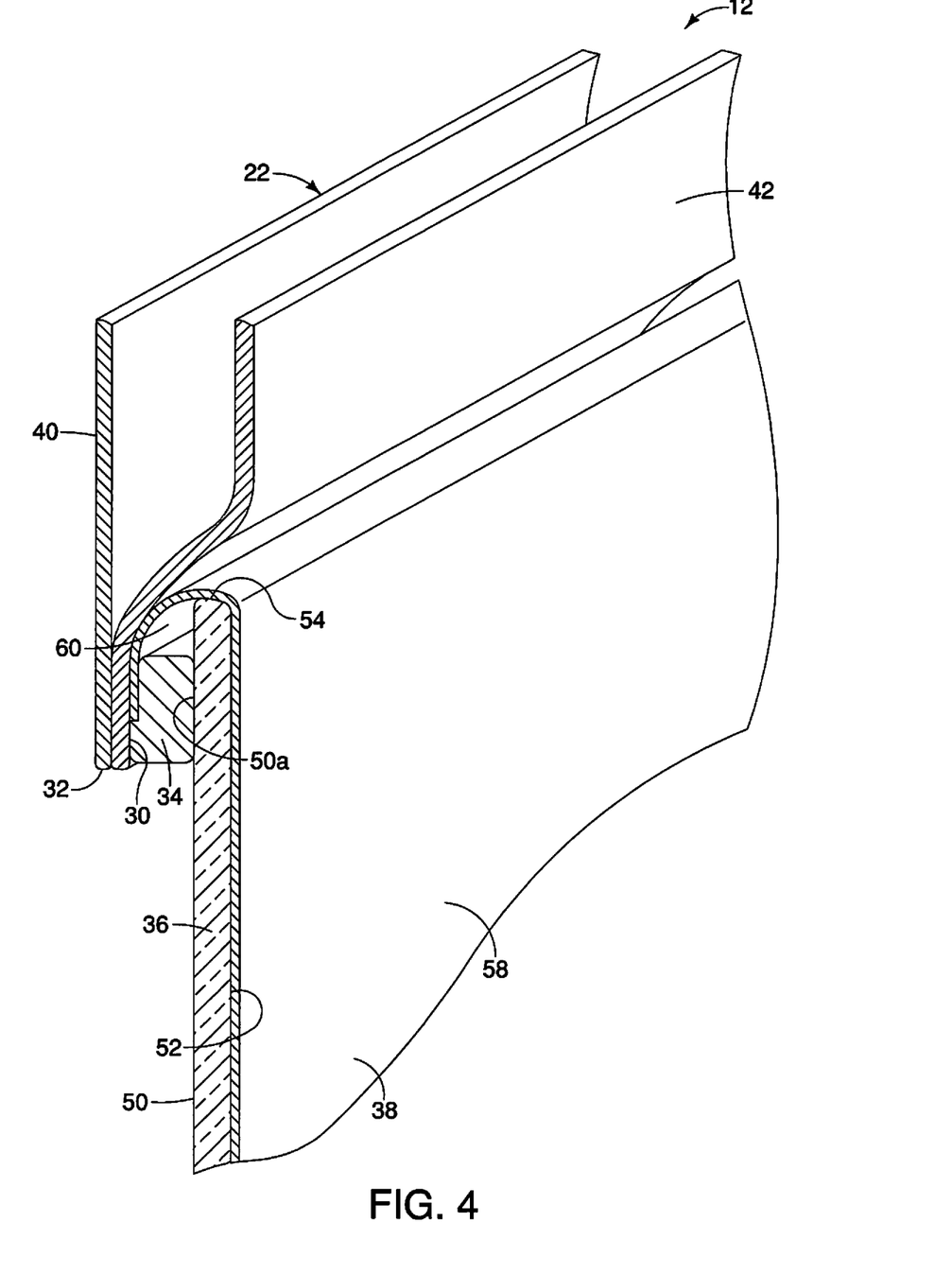
FIG. 4 is a perspective cross-sectional view of the window structure taken along the line 4-4 in FIG. 1, showing the window glass fixed to the vehicle body structure by the sealant/adhesive material, and showing the flexible sheet material covering an exterior surface of the window glass and also being attached to the vehicle body structure by the sealant/adhesive material and further being in direct contact with the vehicle body structure in accordance with the first embodiment.

A more detailed description of the window structure 12 is now provided with specific reference to FIGS. 3 and 4. As shown in FIG. 3, the body panel 22 can be one of the side panels of the body structure 14 or can be the door 24. For simplification of the following description, the body panel 22 will be described. However, the body panel 22 has a similar, or identical structure as it relates to the description of the window structure 12 below.

The window structure 12 basically includes a window supporting portion 30 of the body panel 22 that surrounds and defines a window opening 32, a sealant/adhesive material 34, a window glass 36 and a flexible sheet material 38. The body panel 22 includes the window supporting portion 30, the window opening 32, an interior surface 40 and an exterior surface 42. As shown in FIG. 4, the body panel 22 can be formed with several individual panel members that are welded together or otherwise fixedly attached to one another thereby defining the body panel 22 (and similarly, the door 24). The window supporting portion 30 extends completely around a periphery of the window opening 32. The window supporting portion 30 can be recessed relative to the adjacent areas of the body panel 22. Further, the window supporting portion 30 is basically a flange that the window glass 36 is mounted to during installation.

In FIG. 3, the window opening 32 is depicted as having a rectangular shape. However, it should be understood from the drawings and the description herein that the window opening 32 can have any of a variety of shapes and is not limited to the rectangular shape in the drawings.

The sealant/adhesive material 34 is a conventional material that serves as both a sealant material and an adhesive that fixedly attaches the window glass 36 to the window supporting portion 30. The sealant/adhesive material 34 can be preformed to a shape that conforms to the shape of the window supporting portion 30 and the window glass 36, or can be applied directly to an outer periphery 50a of the interior surface 50 of the window glass 36 or to the window supporting portion 30. Since sealant/adhesive materials are conventional materials well known in the art, further description is omitted for the sake of brevity The window glass 36 has an interior surface 50, an exterior surface 52 and an outer peripheral edge 54 extending around the window glass 36 between the interior surface 50 and the exterior surface 52. The window glass is non-movably fixed to the window supporting portion 30 by the sealant/adhesive material 34.

The flexible sheet material 38 has a main section 58 and an attachment section 60. The main section 58 of the flexible sheet material 38 covers the exterior surface 52 of the window glass 36. The attachment section 60 extends over at least a portion of the outer peripheral edge 54 of the window glass 36 and away from the exterior surface 52 of the window glass 36. The attachment section 60 is fixedly attached to the window supporting portion 30 of the body structure 14. More specifically, as shown in FIG. 4, the attachment section 60 overlies a portion of the window supporting portion 30. The sealant/adhesive material 34 is applied to the window glass 36 so that the sealant/adhesive material 34 contacts and adheres to the attachment section 60, thereby fixedly attaching the attachment section 60 of the flexible sheet material 38 to the window supporting portion 30 of the body panel 22.

It should be understood from the drawings and the description herein that the flexible sheet material 38 can be a uniform material and that there is no structural difference between the main section 58 and the attachment section 60 of the flexible sheet material 38, except that the main section 58 is in direct contact with the exterior surface 52 of the window glass 36 and the attachment section 60 does not contact the exterior surface 52 of the window glass 36

The flexible sheet material 38 can be made of any of a variety of materials. For example, the flexible sheet material 38 can be formed from a polymer material, such as polyethylene, or can be a nylon material. Further, the flexible sheet material 38 can be a laminated material with multiple polymer layers and a nylon reinforcement layer. Preferably, the flexible sheet material 38 is transparent so that there is visibility through the window glass 36 covered by the flexible sheet material 38.

However, the flexible sheet material 38 is required to have sufficient strength to withstand the tests associated with FMVSS 226. Specifically, during the performance tests of FMVSS 226, a 40 pound impact device is impacted against selected areas of the interior surface 50 of the window glass 36 while installed to the window supporting portion 30 of the body structure 14. During these tests, the window glass 36 can crack and or be shattered into multiple pieces. The presence of the flexible sheet material 38 serves several purposes. First, the flexible sheet material 38 retains most if not all of the pieces of the window glass 36 after impact. Second, the flexible characteristics of the flexible sheet material 38 facilitates absorption of a portion of the impact energy and prevents objects from within the vehicle 10 from being ejected through the window opening 32. Further, the flexible sheet material 38 has sufficient strength to remain intact in response to multiple impacts that are a part of the performance tests of FMVSS 226.

As is further shown in FIG. 4, an outward periphery of the interior surface 50 of the window glass 36 is fixedly attached the window supporting portion 30 by the sealant/adhesive material 34. Further, the attachment section 60 of the flexible sheet material 38 is fixed directly to the window supporting portion 30 by the sealant/adhesive material 34. As a result of this attachment to the window supporting portion 30, the attachment section 60 of the flexible sheet material 38 wraps over the outer peripheral edge 54.

It should be understood from the drawings and the description herein, that the cross-sectional view in FIG. 4 represents not just the area in FIG. 1 at the line 4-4, but further represents the cross-sectional view of the window structure 12 around the entire window supporting portion 30. In other words, the attachment section 60 of the flexible sheet material 38 is fixed to the window supporting portion 30 by the sealant/adhesive material 34 in a uniform manner around the entire area of the window supporting portion 30.

Second Embodiment

Figure 5:
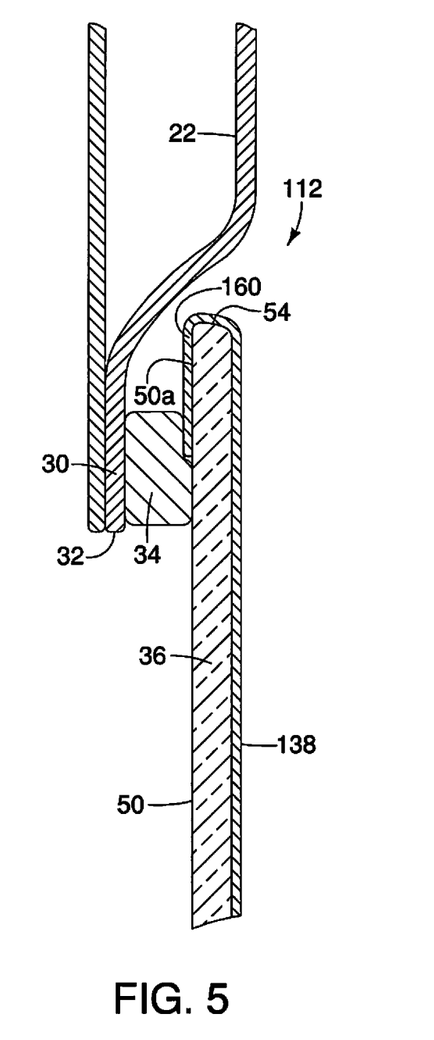
FIG. 5 is a cross-sectional view of a window structure, similar to FIG. 4, showing a flexible sheet material covering an exterior surface of the window glass and wrapping around a peripheral edge of the window glass such that a portion of the flexible sheet material further overlays a portion of the interior surface of the window glass, with the flexible sheet material being fixedly coupled to the vehicle body structure by the sealant/adhesive material in accordance with a second embodiment.

Referring now to FIG. 5, a window structure 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the window structure 112 includes the window supporting portion 30 of the body structure 14, the sealant/adhesive material 34 and the window glass 36, described above with respect to the first embodiment. However, in the second embodiment, a flexible sheet material 138 is installed differently from the arrangement of the flexible sheet material 38 of the first embodiment. Specifically, an attachment section 160 of the flexible sheet material 138 is wrapped around the outer peripheral edge 54 of the window glass 36, completely covering the outer peripheral edge 54. Further, the attachment section 160 of the flexible sheet material 138 extends along the outward periphery 50a of the interior surface 50 of the window glass 36. The sealant/adhesive material 34 fixedly attaches the window glass 36 to the window supporting portion 30 and further overlies a portion of the attachment section 160 of the flexible sheet material 138. In other words, the attachment section 160 of the flexible sheet material 138 extends between the interior surface 50 of the window glass 36 and a portion of the sealant/adhesive material 34. Hence, the attachment section 160 of the flexible sheet material 38 is fixed to the sealant/adhesive material 34, which is in turn fixed to the window supporting portion 30 of the body panels 22.

Third Embodiment

Figure 6:
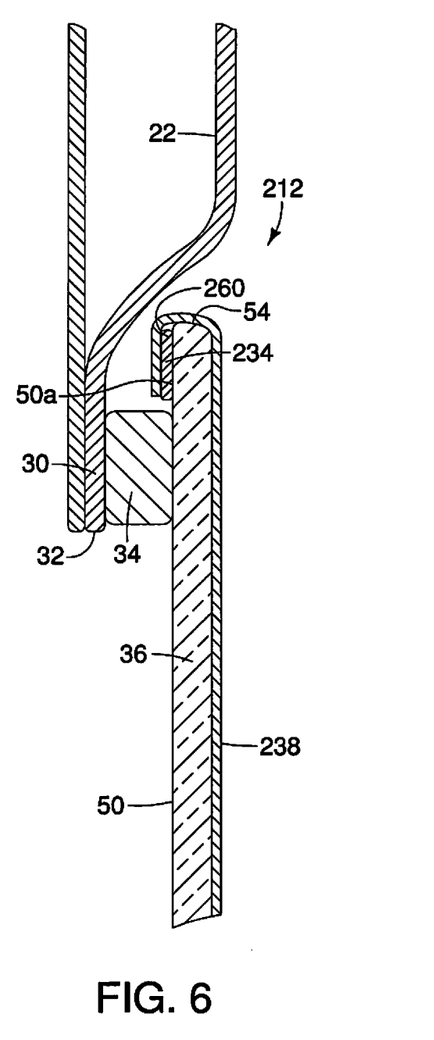
FIG. 6 is a cross-sectional view of a window structure, similar to FIGS. 4 and 5, showing a flexible sheet material covering an exterior surface of the window glass and wrapping around a peripheral edge of the window glass such that a portion of the flexible sheet material further overlays and is fixed to a portion of the interior surface of the window glass by an adhesive material in accordance with a third embodiment.

Referring now to FIG. 6, a window structure 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the window structure 212 includes the window supporting portion 30 of the body structure 14, the sealant/adhesive material 34 and the window glass 36, described above with respect to the first embodiment. However, in the third embodiment, a flexible sheet material 238 is installed differently from the arrangement of the flexible sheet material 38 of the first embodiment. Specifically, an attachment section 260 of the flexible sheet material 238 is wrapped around the outer peripheral edge 54 of the window glass 36, completely covering the outer peripheral edge 54. Further, the attachment section 260 of the flexible sheet material 238 extends along the outward periphery 50a of the interior surface 50 of the window glass 36 and is fixed to the outer periphery 50a with a separate sealant/adhesive material 234. In the third embodiment, the attachment section 260 of the flexible sheet material 238 is spaced apart from the sealant/adhesive material 34. However, since the sealant/adhesive material 34 that holds the window glass 36 to the window supporting portion 30 is adjacent to the sealant/adhesive material 234, the flexible sheet material 238 is reliably fixedly coupled to the window supporting portion 30 and meets the performance requirements of FMVSS 226.

Fourth Embodiment

Figure 7:
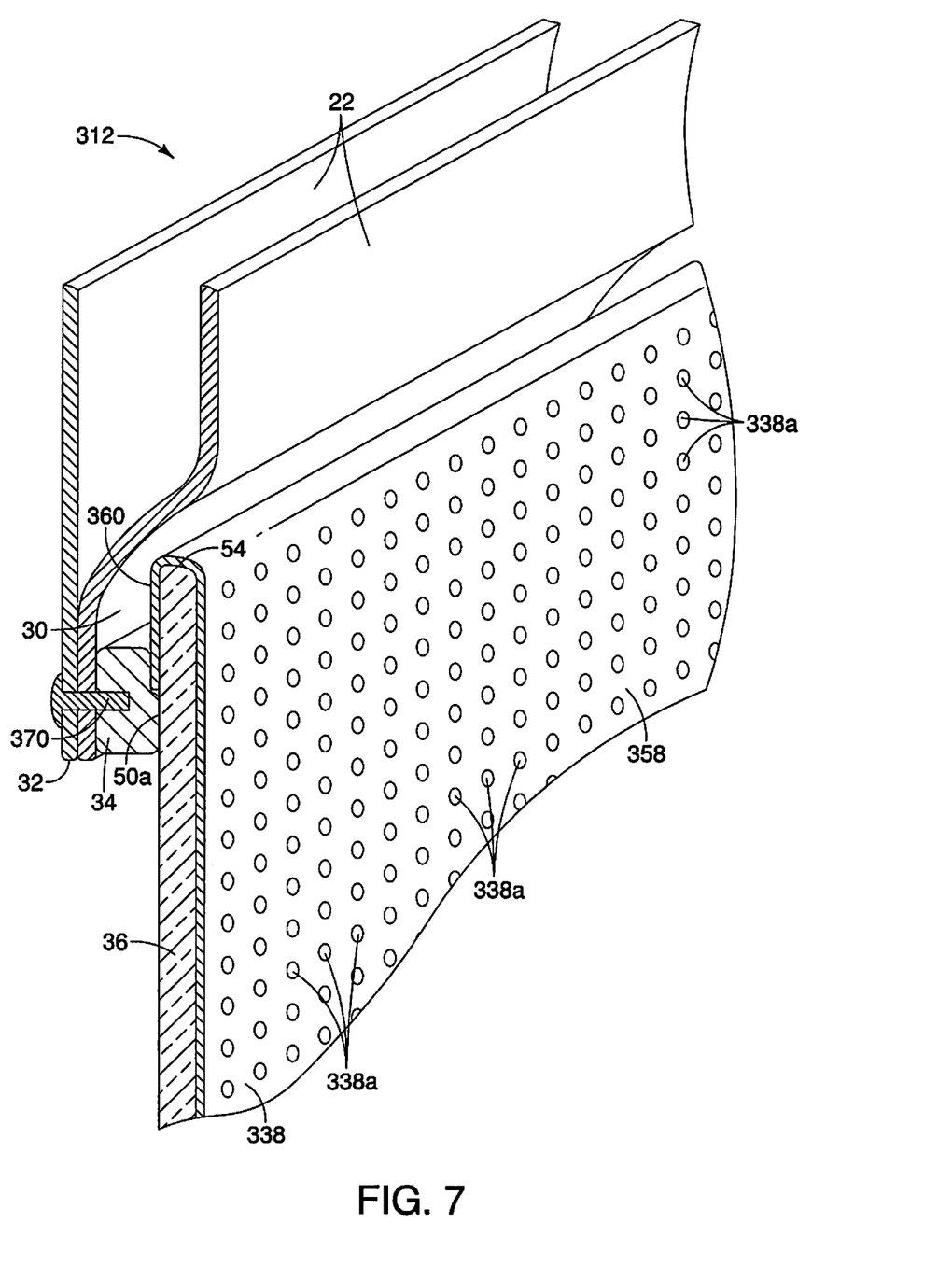
FIG. 7 is a cross-sectional view of a window structure, similar to FIGS. 4, 5 and 6, showing a flexible sheet material that includes a plurality of apertures and covers an exterior surface of the window glass, the flexible sheet material further wrapping around a peripheral edge of the window glass such that a portion of the flexible sheet material further overlays a portion of the interior surface of the window glass, with the flexible sheet material and the window glass being fixedly coupled to the vehicle body structure by the sealant/adhesive material in accordance with a fourth embodiment.

Referring now to FIG. 7, a window structure 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the window structure 312 includes the window supporting portion 30 of the body structure 14, the sealant/adhesive material 34 and the window glass 36, described above with respect to the first embodiment. However, in the fourth embodiment, a flexible sheet material 338 is used. The flexible sheet material 338 is installed in a manner similar to that described above with respect to the second embodiment. Specifically, an attachment section 360 of the flexible sheet material 338 is wrapped around the outer peripheral edge 54 of the window glass 36, completely covering the outer peripheral edge 54. Further, the attachment section 360 of the flexible sheet material 238 extends along the outward periphery 50a of the interior surface 50 of the window glass 36 and is fixed to the outer periphery 50a by the sealant/adhesive material 34.

In the fourth embodiment, the flexible sheet material 338 has a decorative feature printed or otherwise provided on an exposed surface of a main section 358 thereof. Specifically, the main section 358 of the flexible sheet material 338 has artwork, graphics and/or advertising material. However, in order to ensure visibility through the flexible sheet material 338, the main section 358 of the flexible sheet material 338 is provided with a plurality of small apertures 338a.

It should be understood from the drawings and the description herein that the flexible sheet material 338 of the fourth embodiment can be used in any of the above described embodiments and is not limited to the specific arrangement of the attachment section 360 of the fourth embodiment. In other words, artwork and the small apertures 338a can be provided to any embodiment described herein.

In the fourth embodiment, the window supporting portion 30 of the body structure 14 can additionally be provided with fasteners or pins 370 that are installed through apertures formed in the window supporting portion 30. Although only one pin 370 is shown in FIG. 7, a plurality of the pins 370 can be employed at predetermined intervals around the window supporting portion 30 of the body structure 14. The plurality of pins 370 provide additional contact surfaces for the adherence of the sealant/adhesive material 34, thus ensuring a solid attachment between the window supporting portion 30 of the body structure 14 and the window glass 36 and the flexible sheet material 338.

Fifth Embodiment

Figure 8:
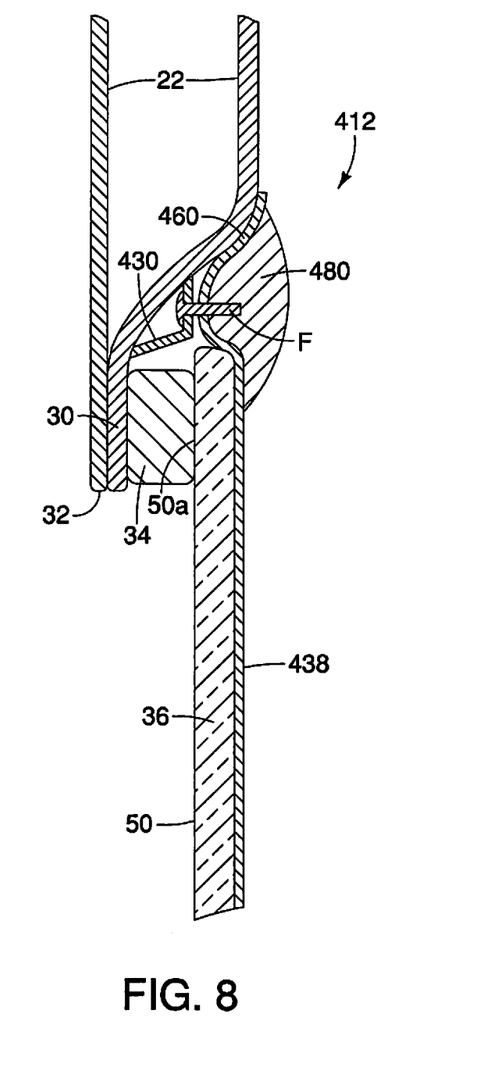
FIG. 8 is a cross-sectional view of a window structure, similar to FIG. 4-7, showing a flexible sheet material covering an exterior surface of the window glass with a portion of the flexible sheet material further overlaying a flange that is fixed to the vehicle body structure, with a trim element fixed to the vehicle body structure and securing the flexible sheet material to the vehicle body structure in accordance with a fifth embodiment.

Referring now to FIG. 8, a window structure 412 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the window structure 412 includes the window supporting portion 30 of the body structure 14, the sealant/adhesive material 34 and the window glass 36, described above with respect to the first embodiment. However, in the fifth embodiment, the window supporting portion 30 includes a series of brackets or flanges 430 that include a fastener F that extends therefrom. The flanges 430 are fixed (i.e. welded) to the window supporting portion 30 at spaced apart intervals around the window opening 32. The fasteners F can be snap fitting projections or threaded fastener elements that attach to a trim ring 480. The trim ring 480 is dimensioned such that it encircles the window opening 32 and encircles the outer peripheral edge 54 of the window glass 36. The trim ring 480 is installed to the fasteners F after the window glass 36 and a flexible sheet material 438 is installed to the window supporting portion 30.

The flexible sheet material 438 is installed in a manner that differs from that described above with respect to the first embodiment. Specifically, an attachment section 460 of the flexible sheet material 438 is wrapped only partially around the outer peripheral edge 54 of the window glass 36. The attachment section 460 further extends from the outer peripheral edge 54 of the window glass 36 and between the window supporting portion 30 and the trim ring 480. Consequently, the trim ring 480 retains the flexible sheet material 438 to the window supporting portion 30. Although the sealant/adhesive material 34 fixedly attaches the window glass 36 to the window supporting portion 30 of the body panel 22, the trim ring 480 also retains the window glass 36 to the window supporting portion 30.

It should be understood from the drawings and the description herein that in each of the embodiments, the flexible sheet material 38, the flexible sheet material 138, the flexible sheet material 238, the flexible sheet material 338 and the flexible sheet material 438 can basically all be made of the same material or materials (except that in the fourth embodiment the flexible sheet material 338 includes artwork and apertures 338a). However, the basic flexible sheet material remains the same in each embodiment. Rather, the various embodiment show differing ways to directly attached and/or fixedly couple the flexible sheet material to structures adjacent to the window glass 36 and the window opening 32. The attachment of the flexible sheet materials 38, 138, 238, 338 and 438 to the adjacent body structure, in addition to the attachment of the window glass 36 to the window supporting portion 30, provides a reliable way to secure the fixed installation of the window glass 36 and meet the standards set forth in the performance tests of FMVSS 226.

The vehicle 10 includes many elements and features are conventional and are well known in the art. Since these elements and features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle window structure. Accordingly, these terms, as utilized to describe the present invention should be interpreted relative to a vehicle equipped with the vehicle window structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle window structure comprising
a vehicle body structure defining a window opening with a window supporting portion extending around a periphery of the window opening;
a window glass having an interior surface, an exterior surface and an outer peripheral edge extending around the window glass between the interior surface and the exterior surface, the window glass being non-movably fixed to the window supporting portion at an attachment location; and
a flexible sheet material having a main section and an attachment section, the main section of the flexible sheet material completely covering the exterior surface of the window glass, the attachment section extending over at least a portion of the outer peripheral edge of the window glass and away from the exterior surface of the window glass, the attachment section being fixedly attached to the vehicle body structure at an area spaced apart from the attachment location.

2. The vehicle window structure according to claim 1, wherein
an outward periphery of the interior surface of the window glass is fixedly attached the window supporting portion by an adhesive material.

3. The vehicle window structure according to claim 2, wherein
the flexible sheet material is fixed to the window supporting portion by a trim element.

4. The vehicle window structure according to claim 3, wherein
the trim element is attached to the window supporting portion by a mechanical fastener.

5. The vehicle window structure according to claim 1, wherein
the window glass is retained to the window supporting portion by a trim element.

6. The vehicle window structure according to claim 5, wherein
the flexible sheet material is fixed to the window supporting portion by the trim element.

7. The vehicle window structure according to claim 5, wherein
the trim element is attached to the window supporting portion by a mechanical fastener.

8. The vehicle window structure according to claim 1, wherein
the area spaced apart from attachment location where the attachment section of the flexible sheet material is fixedly attached to the vehicle body structure is also spaced apart from the window supporting portion.

9. The vehicle window structure according to claim 1, wherein
the area spaced apart from attachment location where the attachment section of the flexible sheet material is fixedly attached to the vehicle body structure is also spaced apart from the window glass.

10. A vehicle window structure comprising
a vehicle body structure defining a window opening with a window supporting portion extending around a periphery of the window opening;
a window glass having an interior surface, an exterior surface and an outer peripheral edge extending around the window glass between the interior surface and the exterior surface, the window glass being non-movably fixed to the window supporting portion; and
a flexible sheet material having a main section and an attachment section, the main section of the flexible sheet material covering the exterior surface of the window glass, the attachment section extending over at least a portion of the outer peripheral edge of the window glass and away from the exterior surface of the window glass, the attachment section being fixedly coupled to the vehicle body structure, an outward periphery of the interior surface of the window glass being fixedly attached the window supporting portion by an adhesive material and the attachment section of the flexible sheet material being fixed to the window supporting portion by the adhesive material.

11. The vehicle window structure according to claim 10, wherein
the attachment section of the flexible sheet material extends between a section of the window supporting portion and a portion of the adhesive material.

12. The vehicle window structure according to claim 10, wherein
the attachment section of the flexible sheet material is fixed to the adhesive material.

13. A vehicle window structure comprising
a vehicle body structure defining a window opening with a window supporting portion extending around a periphery of the window opening;
a window glass having an interior surface, an exterior surface and an outer peripheral edge extending around the window glass between the interior surface and the exterior surface, the window glass being non-movably fixed to the window supporting portion; and
a flexible sheet material having a main section and an attachment section, the main section of the flexible sheet material covering the exterior surface of the window glass, the attachment section extending over at least a portion of the outer peripheral edge of the window glass and away from the exterior surface of the window glass, the attachment section being fixedly coupled to the vehicle body structure, an outward periphery of the interior surface of the window glass is fixedly attached the window supporting portion by an adhesive material, and the attachment section of the flexible sheet material being fixed to the outer periphery of the interior surface by another adhesive material.

14. The vehicle window structure according to claim 13, wherein
the another adhesive material is located along the outward periphery of the interior surface of the window glass between the interior surface and a portion of the adhesive material.

* * * * *